(12) United States Patent
Holl et al.

(10) Patent No.: US 7,276,092 B2
(45) Date of Patent: Oct. 2, 2007

(54) ELECTROCHEMICAL ELEMENT IN THE FORM OF A BUTTON CELL, AND A METHOD FOR PRODUCING AN ELECTROCHEMICAL ELEMENT

(75) Inventors: Konrad Holl, Aalen-Dewangen (DE); Alfons Joas, Tannhausen (DE); Horst Wagner, Rosenberg (DE); Kemal Akca, Ellwangen (DE); Arno Perner, Ellwangen (DE); Dejan Ilic, Ellwangen (DE)

(73) Assignee: Varta Microbattery GmbH (DE)

( * ) Notice: Subject to any disclaimer, the term of this patent is extended or adjusted under 35 U.S.C. 154(b) by 663 days.

(21) Appl. No.: 10/801,016

(22) Filed: Mar. 15, 2004

(65) Prior Publication Data

US 2004/0185338 A1 Sep. 23, 2004

(30) Foreign Application Priority Data

Mar. 21, 2003 (DE) .................. 103 13 830

(51) Int. Cl.
*H01M 6/00* (2006.01)
*H01M 2/12* (2006.01)

(52) U.S. Cl. .................. 29/623.2; 29/623.4; 429/53; 429/56

(58) Field of Classification Search ............ None
See application file for complete search history.

(56) References Cited

U.S. PATENT DOCUMENTS 3,721,586 A 3/1973 Jasinski et al.

FOREIGN PATENT DOCUMENTS

EP 0 693 792 A1 1/1996
GB 2 252 198 A 7/1992

*Primary Examiner*—Jonathan Crepeau
*Assistant Examiner*—Robert Hodge
(74) *Attorney, Agent, or Firm*—DLA Piper US LLP

(57) ABSTRACT

An electrochemical element in the form of a button cell having at least one lithium-intercalating electrode, wherein the cell cover or the cell cup has an opening which is closed in a sealed manner during the formation process. Once the formation process has been completed, it is opened briefly for gas to escape from the cell, and is then closed in a gastight manner. The cell cover and the cell cup are composed in particular of metal. The opening can be closed by a metal or metal/plastic composite sheet, which is adhesively bonded or welded to the cell cover or to the cell cup.

4 Claims, 1 Drawing Sheet

ELECTROCHEMICAL ELEMENT IN THE FORM OF A BUTTON CELL, AND A METHOD FOR PRODUCING AN ELECTROCHEMICAL ELEMENT

RELATED APPLICATION

This application claims priority of German Patent Application No. 103 13 830.7, filed Mar. 21, 2003.

FIELD OF THE INVENTION

The subject matter of this invention relates to an electrochemical element in the form of a button cell having at least one lithium-intercalating electrode, as well as a method for producing an electrochemical element.

BACKGROUND

Electrochemical elements in the form of a button cell are known with various electrodes, for example, with positive nickel hydroxide electrodes and negative metal hydride electrodes, or with negative zinc electrodes and positive silver oxide electrodes, or as lithium-ion cells. These button cells have a cell cup and a cell housing connected to one another in a gastight manner with the interposition of a seal. In the case of rechargeable button cells having at least one lithium-intercalating electrode, gases are developed during the formation process. These cells are thus formed without being sealed under argon as a barrier gas, and are not finally sealed in a gastight manner until the formation process has been completed.

It would therefore be advantageous to create an electrochemical element of the generic type mentioned initially, as well as a method for producing an electrochemical element, in the case of which element and method there is no need for a complex formation process in a barrier gas atmosphere.

SUMMARY OF THE INVENTION

This invention relates to an electrochemical element in the form of a button cell including at least one lithium-intercalating electrode and a housing with an opening, wherein the opening is closed in a sealed manner during formation of the electrochemical element, open once after formation for gas to escape from inside of the electrochemical element, and then closed in a gastight manner.

This invention also relates to a method for producing an electrochemical element in the form of a button cell including placing at least one lithium-intercalating electrode in a housing having an opening, sealing the opening during formation of the electrochemical element, breaking open the opening once formation of the electrochemical element has been completed for gas to escape from inside of the electrochemical element, and closing the opening in a gastight manner.

BRIEF DESCRIPTION OF THE DRAWING

The Drawing shows a cross-sectional view of an electrochemical element in accordance with aspects of the invention.

DETAILED DESCRIPTION

Figure 1:
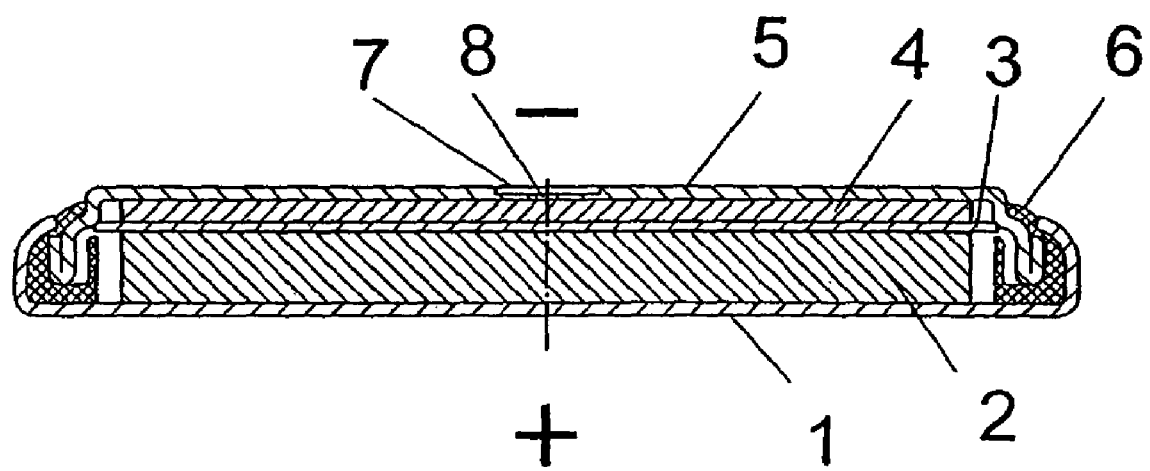

It will be appreciated that the following description is intended to refer to specific embodiments of the invention selected for illustration in the drawing and is not intended to define or limit the invention, other than in the appended claim.

The use of a closable opening in the cover or cup of the button cell housing allows button cells and, in particular, lithium-ion button cells, to be formed in the closed state, without the need for a barrier gas atmosphere in the process. Once the formation process has been completed, the gas is allowed to escape by opening the seal of the opening in the cover or cup, and it is then finally sealed in a gastight manner by closing the opening again.

The cell cover and/or cell cup may be composed of plastic, but are/is preferably composed of metal. The opening is closed in particular by a metal or metal/plastic composite sheet. This sheet can be adhesively bonded or welded to the housing. As the final closure, the opening can be encapsulated with a plastic. When using a closure in the form of a sheet, this can also be used as a bursting membrane, which improves the operational reliability of the cell even in very poor conditions.

The sealing element may be connected to the cover or cup by cold or hot adhesive bonding or by direct welding, for example by means of ultrasound. Alternatively, the opening can be encapsulated with a plastic material.

The formation process is an electrical pre-treatment of the cell after its production, whereby the cell is brought into a useable state. For this purpose the cell is subjected to a sequence of charging and discharging cycles having the following effects:

The electroactive components are brought into the desired state in which maximum features of the cell are guaranteed.

During the charging and discharging cycles, the important parameters of the cell characterizing the quality of the cell are defined, namely capacity and internal resistance.

After the last step in the formation process, the battery is in a charged state allowing safe transport of the cell.

During such a formation process gases can develop which are detrimental to the performance of the cells. Swelling or even bursting of the cells can occur. Such a development of gases can be avoided according to the invention.

The subject matter of the invention will be explained in more detail in the following text with reference to the Drawing.

One example of a lithium-ion button cell, as an exemplary embodiment of the invention, comprises a cup 1 and a cathode 2, which is preferably $LiCoO_2$, $LiNiO_2$ or $LiMn_2O_4$. Furthermore, an anode 4 is provided, preferably composed of graphite or carbon. In addition, a cover 5 and a seal 6, composed of polypropylene, for example, are provided. The anode 4 and the cathode 2 are separated by a separator 3, which is preferably polypropylene or polyethylene.

An opening 8 which can be closed in a reversible manner and through which the formation gases that are developed can escape is located in the cup 1 or cover 5. During the formation process, the opening 8 is bonded or sealed closed by means of a plastic sheet composed of polypropylene or polyethylene, or by means of a metal or metal/plastic composite sheet 7. The metal/plastic composite sheet 7 may, for example, be an aluminum composite sheet. The sheet should allow only as little gas diffusion as possible.

After the formation process, the cell can be degassed by removal of, making a hole in, or punching through the sheet.

The opening is then sealed in a gastight manner. A welded-on or adhesively bonded-on thin metal sheet may be used for this purpose and may be composed of stainless steel, nickel or aluminum.

Depending on the dimensions of the sealing sheet, it may also act as a bursting membrane, for overpressure, during operation of the cell.

The invention claimed is:

1. A method for producing an electrochemical element in the form of a button cell comprising:
   placing at least one lithium-intercalating electrode in a housing having an opening;
   sealing said opening during formation of said electrochemical element;
   breaking open the opening once formation of the electrochemical element has been completed for gas to escape from inside of said electrochemical element; and
   closing said opening in a gastight manner.

2. The method according to claim 1, wherein said opening is closed by a sheet, and said sheet is adhesively bonded or welded to said housing.

3. The method according to claim 2, wherein said housing comprises a cover or a cup and said sheet is adhesively bonded or welded to said cover or said cup.

4. The method according to claim 1, wherein said opening is encapsulated with a plastic.

* * * * *